United States Patent
Milewski et al.

(10) Patent No.: US 6,519,326 B1
(45) Date of Patent: *Feb. 11, 2003

(54) TELEPHONE VOICE-RINGING USING A TRANSMITTED VOICE ANNOUNCEMENT

(75) Inventors: Allen E. Milewski, Red Bank, NJ (US); Thomas M. Smith, Plainfield, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,785

(22) Filed: May 6, 1998

(51) Int. Cl.[7] .............................. H04M 1/64; H04M 1/00
(52) U.S. Cl. .............................. 379/67.1; 379/373.01; 379/374.02; 379/93.01
(58) Field of Search ................................ 379/207, 230, 379/17, 911, 88.03, 67.1, 93.23, 88.21, 142, 88.01, 88.02, 88.12, 88.13, 88.17, 88.19, 373.01, 373.04, 374.02, 373.02, 373.03, 93.01

(56) References Cited

U.S. PATENT DOCUMENTS

| | | | | |
|---|---|---|---|---|
| 5,327,486 A | | 7/1994 | Wolff et al. ............... | 379/93.23 |
| 5,526,406 A | * | 6/1996 | Luneau ....................... | 455/563 |
| 5,594,784 A | * | 1/1997 | Velius ....................... | 379/88.02 |
| 5,850,435 A | * | 12/1998 | Devillier ..................... | 379/374 |
| 5,978,452 A | * | 11/1999 | Cho .......................... | 379/88.24 |
| 5,999,599 A | * | 12/1999 | Shaffer et al. ............. | 379/93.23 |
| 6,002,761 A | * | 12/1999 | Sremac ....................... | 379/374 |
| 6,028,917 A | * | 2/2000 | Creamer et al. ........... | 376/100.1 |
| 6,047,057 A | * | 4/2000 | Weishut et al. ............ | 379/215 |
| 6,052,438 A | * | 4/2000 | Wu et al. ................... | 379/67.1 |
| 6,067,516 A | * | 5/2000 | Levay et al. ............... | 704/244 |

\* cited by examiner

*Primary Examiner*—Fan Tsang
*Assistant Examiner*—Ovidio Escalante
(74) *Attorney, Agent, or Firm*—Kenyon & Kenyon

(57) ABSTRACT

A voice-ringing system is provided. The traditional telephone ring for notifying a called party of an incoming phone call is replaced by a short verbal announcement that is provided by the calling party when placing the phone call. In a manner similar to traditional telephone ringing, the announcement is repeated until the call is answered or until the caller abandons the unanswered call. One implementation for the voice-ringing system is to utilize the Internet as a signaling channel. The calling party establishes a call by utilizing a communications device that is connected to both the Internet and to a voice network. The verbal announcement is sent to the called party as a signal transmitted over the Internet. The called party hears the voice ring on a communications device that is also connected to both the Internet and a voice network. When the called party indicates that the call should be accepted, a return signal is sent to the calling party's communication device. The calling party's communication device then establishes an end-to-end call on the voice network.

32 Claims, 4 Drawing Sheets

TELEPHONE VOICE-RINGING USING A TRANSMITTED VOICE ANNOUNCEMENT

BACKGROUND OF THE INVENTION

The present invention relates to a method and apparatus for signaling receipt of an incoming telephone call. More specifically, the invention provides for replacing the traditional telephone ring that signals receipt of an incoming phone call with a short verbal announcement that indicates that the recipient has received an incoming phone call.

Currently, a called party is notified of an incoming telephone call from a calling party by the ringing of the called party's telephone. Whereas the ringing of the telephone provides the information that the called party has received an incoming call, no other information is provided to the called party about the phone call. Thus, the called party does not know who the call is from, the subject of the call, etc.

It is also currently known how to provide limited information to a called party about an incoming phone call. For example, caller identification systems ("caller ID") can provide the called party with information about the calling party's telephone number and name. However, there is much more information about the call and the calling party that could be useful to the called party that current telephone systems are not able to provide. This additional information could be the topic of the phone call, the urgency of the call, and the estimated duration of the call, e.g., a short question versus a lengthy chat. In addition, it may be useful to convey social information about the call such as whether the caller is apologetic about the hour of the call or is angry or excited. In natural conversation, this information is conveyed through a rich set of linguistic and intonation cues. While this information could be crucial to a called party's decision of whether to accept the incoming call or not, in traditional telephony, there is no way to convey this information to the called party prior to call completion.

Therefore, it would be desirable to provide a method and apparatus for providing additional information to a called party when signaling a called party regarding an incoming telephone call.

SUMMARY OF THE INVENTION

The drawbacks in the prior art are overcome by the present invention for a voice-ringing system. In accordance with the present invention, the traditional telephone ring for notifying a called party about an incoming phone call is replaced by a short verbal announcement that is provided by the calling party when placing the phone call. The called party, instead of being alerted to the telephone call by a ringing sound, would hear the verbal announcement as provided by the caller. For example, the called party may hear, "Hi, this is Joan. I just have a quick question." In a manner similar to traditional telephone ringing, the announcement is repeated until the call is answered or until the caller abandons the unanswered call.

One implementation for the voice-ringing system of the present invention is to utilize the Internet as a signaling channel. The calling party establishes a phone call by utilizing a communications device that is connected to both the Internet and to a voice network. The verbal announcement is transmitted to the called party's communications device as a signal transmitted over the Internet. The called party hears the verbal announcement, i.e., voice-ring, on a communications device that is also connected to both the Internet and a voice network. When the called party indicates that the call should be accepted, a return signal is sent to the calling party's communication device. When the return signal is received, the calling party's communication device establishes an end-to-end call on the voice network.

In this manner, the present invention provides advantages for both the called party and the calling party. For the called party, voice-ringing extends the basis of call-screening from the information currently available, such as the caller's originating phone number and/or name, to include many additional kinds of information. Because the call-type and social information conveyed in a voice-ring can assist the called party in the decision to answer the call, it is likely that more call-s that the called party wants to engage in, and has the time to engage in, will be answered. For the calling party, voice ringing provides an opportunity to negotiate the terms of a conversation that is not currently not available with traditional ringing. In natural conversation, the initiator relies on this negotiation heavily. It is likely that voice-ringing will result in more call completions for call-s that are critical to the caller.

Currently, many called parties accomplish call screening with answering machines. Voice-ringing moves the locus of call screening from the called party's answering machine to the communications network. Voice-ringing conveys call-type and social information in a natural, flexible way. It permits users the freedom to invent their own ways to maximize call completion and does not restrict them to information pre-specified by the telephone network, as with traditional telephone ringing systems.

DETAILED DESCRIPTION

Figure 1:
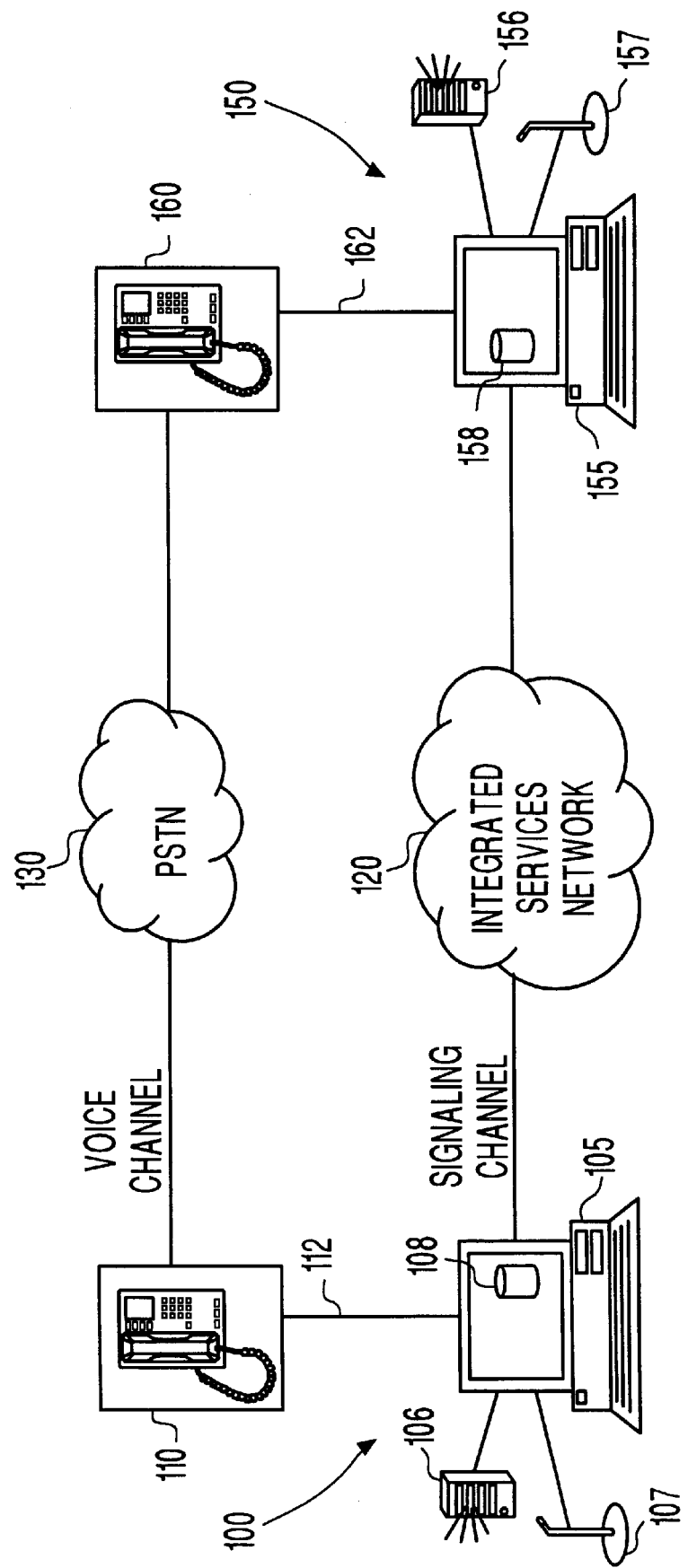
FIG. 1 illustrates a voice-ringing system in accordance with an embodiment of the present invention.

FIG. 1 illustrates one embodiment for the voice-ringing system of the present invention. As can be seen, a calling party's communications device 100 and a called party's communications device 150 are provided. The calling party's communications device 100 includes personal computer (PC) 105 and telephone 110. PC 105 includes speaker 106, microphone 107, and database 108. PC 105 and telephone 110 are interconnected and communicate with each other through serial cable 112 by utilizing well-known means in the art.

The called party's communications device 150 is configured similarly to the calling party's communications device 100. Thus, communications device 150 includes PC 155 and telephone 160, which are interconnected through serial cable 162. PC 155 also includes speaker 156, microphone 157, and database 158.

The calling party's PC 105 is interconnected to the called party's PC 155 through integrated services network 120. Network 120 is a publicly accessible network that provides connectivity for a wide variety of users and for a wide variety of uses. As such, network 120 is not merely a private, internal local area network that utilizes dedicated cabling to interconnect all users. Rather, network 120 is a publicly accessible network, or non-dedicated communications medium, one example of which is the Internet. Through network 120, PC 105 is able to communicate with PC 155.

The calling party's telephone 110 is able to communicate with the called party's telephone 160 through a Public Switched Telephone Network (PSTN) 130, as is well-known in the art.

In practicing the present invention, a calling party who desires to place a phone call to a called party and who desires to signal the receipt of the incoming call to the called party with a voice-announcement call request signal, or "voice-ring", utilizes the calling party's PC 105 to generate and transmit the voice announcement to the called party's PC 155. The calling party utilizes microphone 107 to compose a voice announcement for transmission to the called party's PC 155. The calling party speaks the voice announcement that is to serve as the voice-ring by speaking into microphone 107. An example of a typical voice announcement could be "Hi, Allen, this is Bob. I just have a quick question concerning the patent application." PC 105 can either record and store the voice announcement and then transmit it to the called party's PC 155 as an audio file or can directly transmit the voice announcement to PC 155 as a data stream without first recording the announcement. Thus, it is not required that the voice announcement be first recorded by PC 105 before transmission to the called party's PC 155.

It is also not required that the calling party generate a voice announcement each time that he or she desires to call a party by utilizing a voice-ring. Pre-recorded voice announcements could be stored in database 108 on PC 105 and the calling party could simply select a pre-recorded voice announcement for transmission to the called party's PC 155. A standard voice announcement such as "Hi, this is John Smith, just calling to say hello" could be pre-recorded and stored for use when calling other parties. This would obviate the requirement for the calling party to generate a new voice announcement each time a telephone call is placed. Once a voice announcement is prepared, either by speaking the voice announcement into PC 105 or by selecting a pre-recorded voice announcement from database 108, as discussed above, the calling party transmits the voice announcement to the called party's PC 155 over network 120. In order to direct the announcement to the called party's PC, the calling party uses an appropriate address for the called party's PC, such as an Internet address. In this manner, the connection made between PC 105 and PC 155 over network 120, which could be the Internet, is used as a signaling channel to send a call request signal, i.e., the voice announcement, from PC 105 to PC 155.

When the voice announcement is received at the called party's PC 155, PC 155 will audibly play the voice announcement by utilizing speaker 156. Thus, the called party will hear the example announcement used above of "Hi, Allen, this is Bob. I just have a quick question concerning the patent application." This voice announcement is received at the called party's PC 155 as a voice-ring to alert the called party that the called party has received an incoming call. At this point in the call sequence, the called party is now aware that Bob is calling with a question concerning the patent application, however, the call has not yet been completed, i.e., the called party has not yet answered the call. This is fundamentally different from the method of operation of currently known phone answering systems where the call is first answered by the answering machine and then the calling party records a voice message for the called party. With the present invention, the voice announcement is utilized to alert the called party of an incoming call and the voice announcement is delivered to the called party without first requiring the called party to answer the phone call.

After the voice-ring is received at the called party's PC 155, the called party can decide whether or not to answer the incoming call. If the called party does not answer the call after the first voice-ring, i.e., first occurrence of playing of the voice announcement, the voice-ring will be periodically repeated until the call is either terminated by the calling party or answered by the called party.

If the call is not answered by the called party, the called party's communication device 150 is able to record the received voice-ring and store the voice announcement of the voice-ring in database 158 of the called party's PC 155 and create a message log of received announcements for future reference by the called party. In this manner, if the called party does not answer a particular incoming phone call the called party can be made aware that they have previously received an incoming call that went unanswered by consulting the message log. Also, by playing the recorded voice-ring of the unanswered phone call, the called party can also be provided with information related to the call as provided by the calling party in the voice-ring message.

It is not required that only unanswered incoming phone call voice-ring announcements be recorded in the message log. For reference purposes, the called party may want to record all voice-ring announcements received. The present invention can record and store any voice-ring announcement that is received regardless of whether the incoming phone call is ultimately completed.

If the called party desires to accept the incoming phone call after receipt of the voice-ring announcement, the called party will transmit a return signal, or call answer message, from the called party's PC 155 to the calling party's PC 105 by utilizing a connection established over network 120 between the calling party's PC 105 and the called party's PC 155 to signal that the call is to be accepted. The return signal is not a voice message but rather is data that merely indicates to the calling party's PC 105 that the call is to be accepted. However, the present invention could be practiced by utilizing a voice message as the return signal. If a voice message was utilized as the return signal, the voice message would serve the dual purpose of providing information to the calling party about the conditions of acceptance of the phone call by the called party and would also serve to signal the calling party's PC 105 to establish a voice connection between the calling party's telephone 110 and the called party's telephone 160 over the public switched telephone network (PSTN) 130, as will be described below. If a voice message was utilized as the return signal, a message such as "Hi Bob, I only have a minute to talk," could provide useful information to the calling party. This voice message would be audibly played over speaker 106 of the calling party's PC 105.

As mentioned above, when the return signal that is sent from the called party's PC 155 to the calling party's PC 105 to indicate that the incoming call will be accepted is received at the calling party's PC 105, PC 105 will establish a voice connection between the calling party's telephone 110 and the called party's telephone 160 over a second non-dedicated communications medium, i.e., through PSTN 130, as is well-known in the art. As discussed previously, PCs 105 and 155 are interconnected to telephones 110 and 160, respectively. PC 105 dials the telephone number for the called party's telephone 160 on telephone 110 and PSTN 130 establishes a voice connection between the two telephones. When the voice connection request signal is received at the called party's telephone 160 from PSTN 130, the signal is also received at the called party's PC 155. When this signal is received by PC 155, PC 155 automatically answers the phone call by turning on the speaker (not shown) of telephone 160 and the called party is able to communicate with the calling party in a conventional manner through telephone 160.

It is advantageous to provide for the called party's PC 155 to automatically turn on the speaker of the called party's telephone 160 to complete the voice connection over PSTN 130 because requiring the called party to manually pick up telephone 160 in response to traditional bell ringing in order to complete the voice connection would require two call answering steps by the called party. The first of these is in response to the voice-ring and the second of these would be in response to a bell ring to complete the voice connection. It is not desired to require the called party to manually perform both of these steps. When the called party responds to the voice-ring, the called party has at this point indicated their willingness to accept the incoming call. To require the called party to then manually pick up phone 160 in response to a bell ring to complete the voice connection would detract from the over-all effect that is sought to be achieved. However, it is not required that the called party's PC 155 automatically turn on the speaker of telephone 160 as described. The system can be practiced by requiring the called party to manually pick up telephone 160 in response to a bell ring to complete the voice connection through PSTN 130 between telephones 110 and 160.

In another aspect of the present invention, each potential called party can control whether they will receive voice-ringing at their communications device. For purposes of privacy, a particular called party may not desire that a voice announcement be played at their device. Therefore, each user is able to configure their PC to either accept voice-rings or to only accept traditional bell rings. This information as to the willingness of a particular user to either accept or decline voice-rings is communicated to each other user's communications device by sending a signal over network 120.

Figure 2:
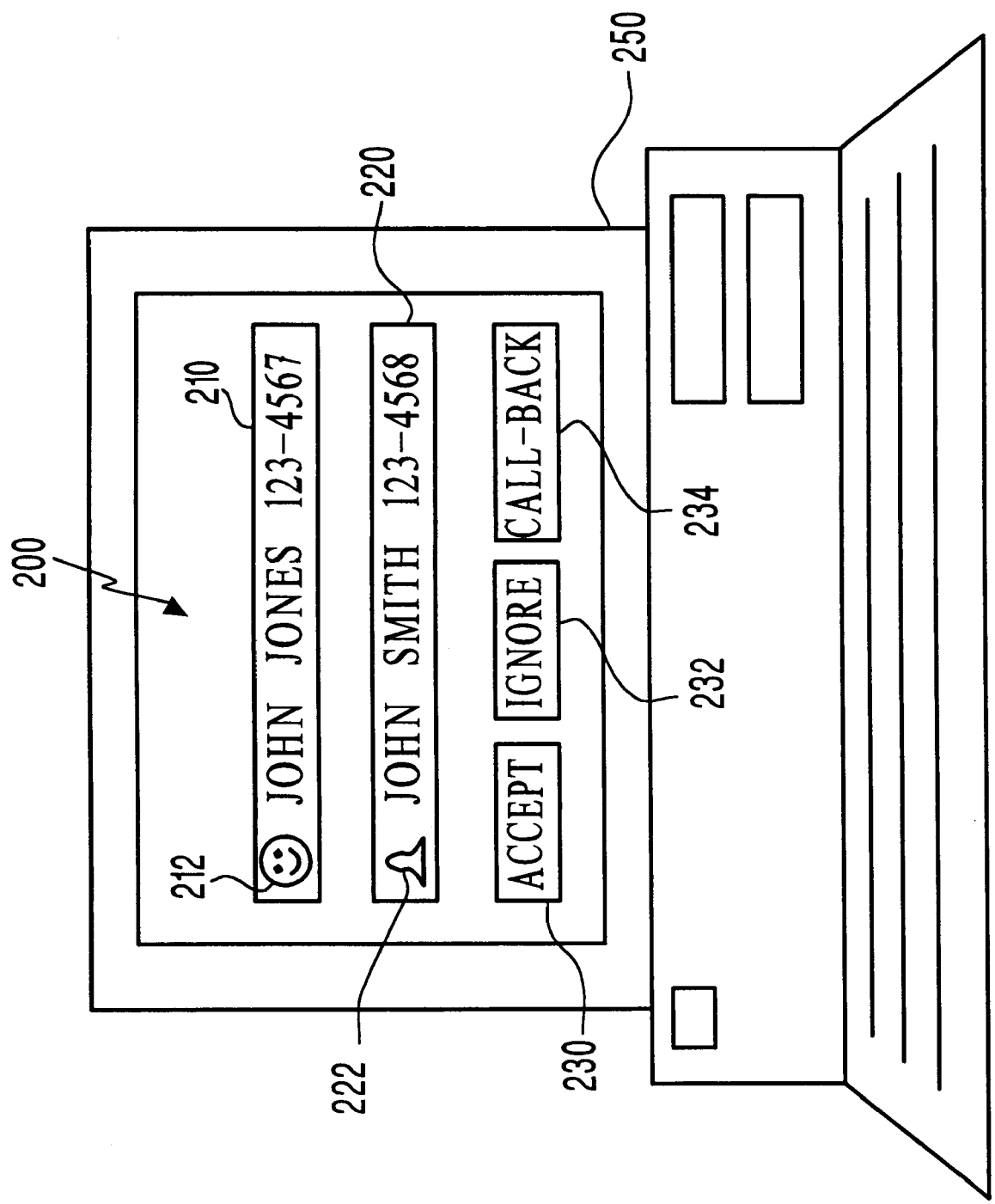
FIG. 2 illustrates an embodiment of a user status display in connection with the present invention.

As is shown in FIG. 2, a user status display 200 can be provided to each user for presentation on a PC 250 of each particular user. In this status display, the names of the other subscribers to the voice-ring system are displayed along with their telephone numbers and an indication as to their desires with respect to accepting voice-rings. For example, status listing 210 shows that John Jones is willing to accept voice-rings. This willingness is indicated by the "happy face" icon 212 that is displayed. Status listing 220 shows that John Smith is not willing to accept voice-rings. This is indicated by the bell icon 222. The present invention is not limited to the particular format that is illustrated in FIG. 2 for the status display, including the use and style of icons 212 and 222. Additionally, the use of the status display itself is not required when practicing the present invention.

Status listings 210 and 220 not only provide status information with respect to other users of the voice-ring system, but also serve to provide for a quick and efficient means for a calling party to transmit a voice-ring to a called party's PC. By clicking on the status listing, the PC will transmit the voice-ring announcement provided by the caller to the PC of the individual that is identified in the status listing. Computer addresses and telephone numbers for each individual identified in a status listing may be stored in each user's PC.

Also shown in FIG. 2 are call disposition icons 230, 232, and 234. These icons are displayed on each user's status display 200 and are utilized by the called party to respond to an incoming phone call, for which the receipt thereof may be signaled by a voice-ring if voice-ringing is activated by the user. By using well-known means of performing a computer operation by selecting an icon, the called party can either accept the call by selecting icon 230, ignore, i.e., not answer, the call by selecting icon 232, or can send a message via voice, text or data back to the calling party's computer that the called party will return the calling party's call at a later time by selecting icon 234.

Figure 3:
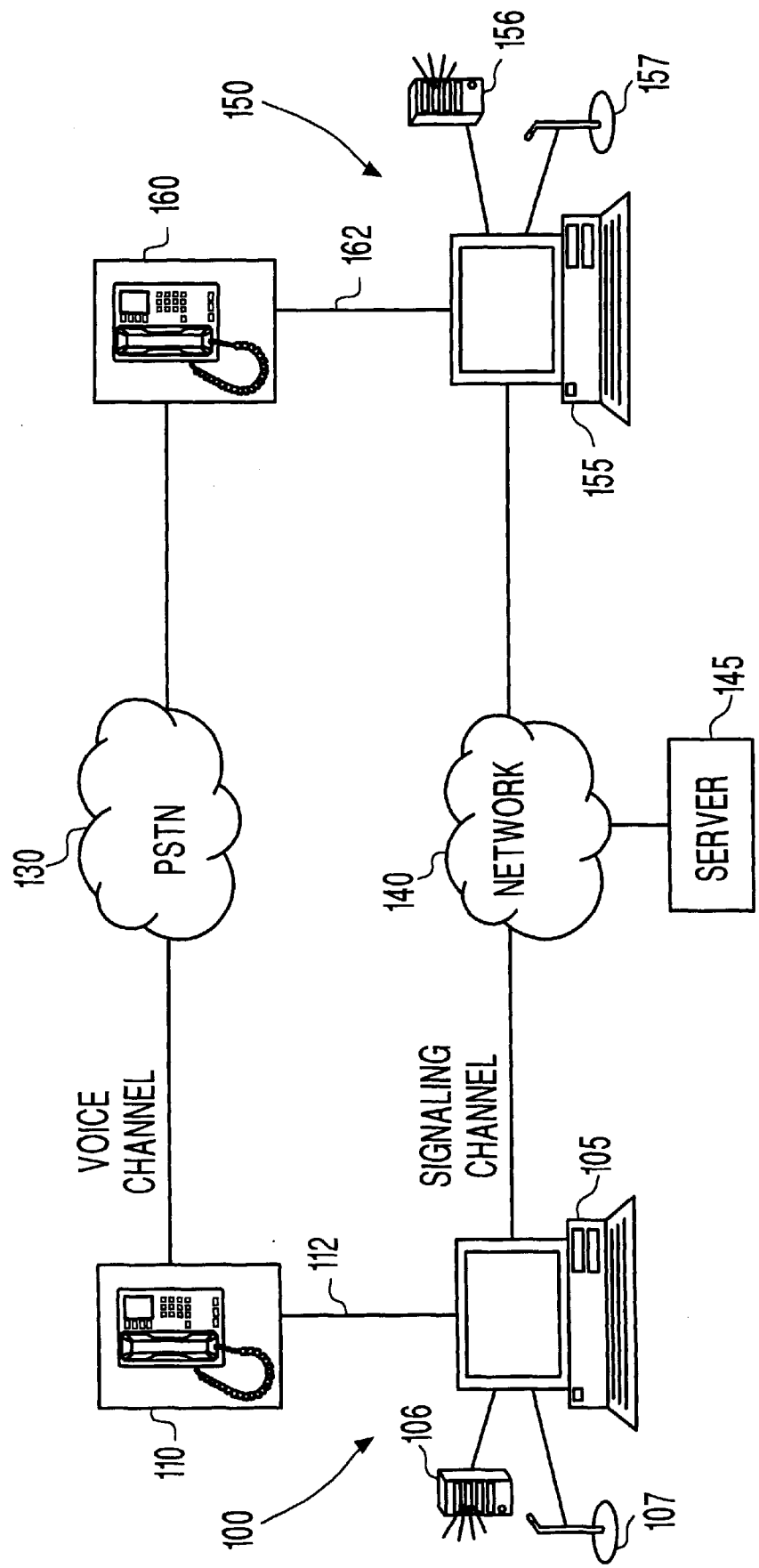
FIG. 3 illustrates a voice-ringing system in accordance with a second embodiment of the present invention.

FIG. 3 illustrates an alternative embodiment for the voice-ringing system of the present invention. FIG. 3 illustrates an embodiment where the calling party's PC 105 and the called party's PC 155 are interconnected through network 140 by server 145. Network 140, like network 120 in FIG. 1, is a publicly accessible network that provides connectivity for a wide variety of users.

In contrast to the embodiment of FIG. 1, where PCs 105 and 155 directly communicate with each other over network 120, the embodiment of FIG. 3 includes server 145 to provide for connection between PCs 105 and 155. When a calling party at PC 105 desires to place a phone call to a called party at PC 155, and thus send a voice-ring to PC 155, the calling party will log into server 145 and server 145 will establish the connection with PC 155. Server 145 will establish the connection with PC 155 by utilizing a computer address for PC 155 that is either provided to server 145 by the calling party or is stored in server 145 and accessed by the server by utilizing other information input to the server by the calling party to identify the called party. Server 145 will correlate the identification information for the called party input to it to a computer address for the called party and establish a connection between PC 105 and 155 by utilizing the accessed computer address.

The utilization of server 145 may provide for a more efficient means for interconnecting user PCs, especially in the situation where a calling party desires to establish a conference call with several called parties. Server 145 could establish connections with each of the called parties and provide the same voice-ring message to each of the called parties. This voice-ring message could be, for example, "This is Tom, I'm attempting to establish a conference call to discuss our new product." To identify each of the called parties that the calling party desires to have participate in the conference call, the calling party can either individually identify each called party to server 145 so that the server can establish a connection to each desired called party or a single group identifier that is associated with a group that includes each desired called party could be established and selected by the calling party.

In the embodiment of FIG. 3, server 145 also performs various administrative functions for the voice-ringing system of the present invention. Server 145 could maintain the status listing for each user. Rather than requiring each user's PC to transmit and receive status listing information for each other user and store this status listing information, the information can be transmitted to, and received and stored on, server 145 and just be accessed by each user. This would conserve memory on each user's PC and reduce the software and computing requirements for each user's PC. Server 145 could also be utilized to download any required software to a new subscriber's PC.

Additionally, server 145 could maintain an account for each user. This account could store information related to the number of call-s made by each user which could be used for billing or other purposes. Additionally, each user's account could include the call message log of received announcements for each user, as described previously. Each user could access server 145 to view their account information.

Also, as discussed previously, any pre-recorded voice-ring announcements for transmission by each user could be stored in the account of each user on the server. Again, by utilizing server 145 to maintain this information, computing power could be conserved on each user's PC.

Figure 4:
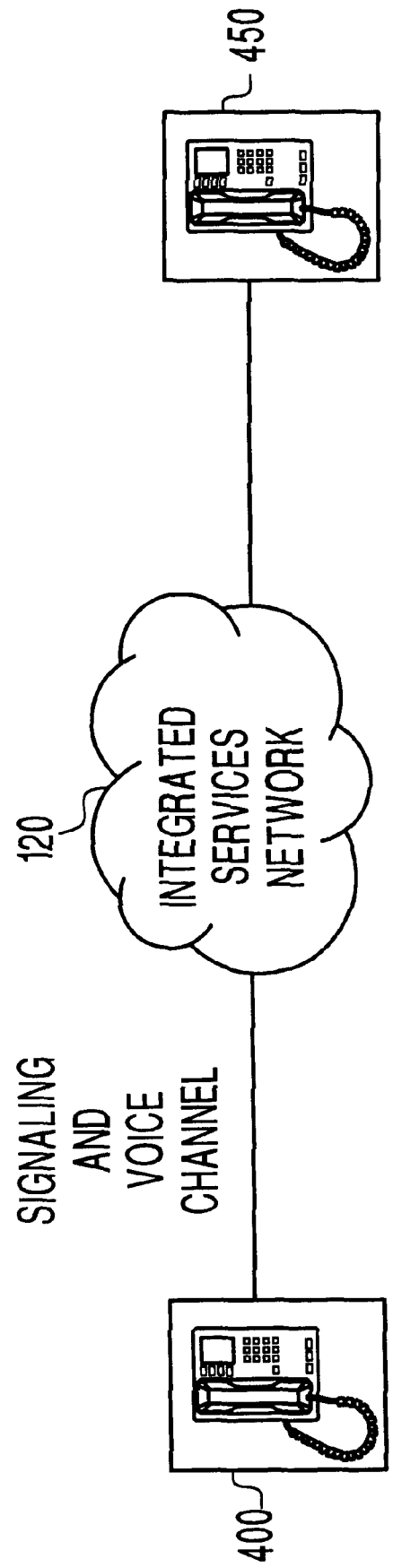
FIG. 4 illustrates a voice-ringing system in accordance with a third embodiment of the present invention.

FIG. 4 illustrates a third embodiment for the voice-ringing system of the present invention. In the embodiment of FIG. 4, as contrasted with the embodiment of FIG. 1, only a single non-dedicated communications medium is utilized to provide connection between the calling party's communication device 400 and the called party's communications device 450. The system operates in the same manner as was described for the embodiment of FIG. 1, in that a voice-ring announcement is generated and transmitted to a called party to signal an incoming phone call, however, in this embodiment, both the voice-ring call request signal and the voice connection are established over the same communications medium, i.e., by utilizing integrated services network 120. As such, the second connection, or voice connection, is not established over the PSTN as was done in the embodiment of FIG. 1. Network 120 is used to provide both the signaling channel and the voice channel.

In the embodiment of FIG. 4, network 120 could be any publicly accessible integrated services network, such as the Internet, and communication devices 400 and 450 could be Internet telephones. Alternatively, communication devices 400 and 450 could be PCs with microphones. The embodiment of FIG. 4 is advantageous in that it does not require the use of the PSTN to establish the voice connection between the calling and called parties, however, due to the current state of technology for transmitting real-time voice communications over an integrated services network, such as the Internet, these voice communications may not be of the highest quality. Issues of latency and computer processing of the voice data packets may affect the quality of the voice communications. Therefore, while the present invention may currently be embodied as illustrated in FIG. 4, it may be advantageous to implement the system as embodied in FIG. 1 to provide for higher quality voice communications. Currently available Internet voice communication capabilities are sufficient to adequately transmit the voice-ring announcement to a called party because the announcement is typically short in duration. However, as discussed above, the Internet does not provide for the highest quality real-time, interactive voice communications.

Several variations on the disclosed embodiments are contemplated. In the disclosed embodiments, the communications devices are referred to as the called party's communications device and the calling party's communications device, however, each communications device is not limited to only serving as either the calling party's communications device or the called party's communications device. Each device may serve as either the calling or the called communications device.

Additionally, the communications devices and non-dedicated communications medium are not limited to the disclosed embodiments, i.e., telephone, PC, etc. The present invention may be utilized with any communications device and non-dedicated communications medium. For example, the present invention may be practiced in an embodiment where the communications devices are cellular phones and the non-dedicated communications medium is a cellular telephone network. All that is required is that the devices be capable of generating and transmitting, and receiving and playing, a voice announcement transmitted over a communications medium.

The disclosed embodiments are illustrative of the various ways in which the present invention may be practiced. Other embodiments can be implemented by those skilled in the art without departing from the spirit and scope of the present invention.

What is claimed is:

1. A method for completing a telephone call comprising the steps of:

transmitting a call request signal over a non-dedicated communications medium by a first communications device, said call request signal containing a verbal announcement generated prior to transmitting the call request signal to a called party, and said call request signal being transmitted without requiring any system recognition of any portion of the verbal announcement content;

receiving said call request signal at a second communications device;

audibly playing said verbal announcement of said call request signal by said second communications device;

transmitting a call answer message over said non-dedicated communications medium to said first communications device in response to said played verbal announcement; and establishing a voice connection between said first and second communications devices in response to said call answer message.

2. The method of claim 1 wherein said first and second communications devices include personal computers.

3. The method of claim 1 wherein said first and second communications devices are personal computers connected respectively to a first and second telephone.

4. The method of claim 1 wherein said non-dedicated communications medium is an integrated services network.

5. The method of claim 4 wherein said integrated services network is the Internet.

6. The method of claim 1 wherein said call request signal and said call answer message are transmitted over the Internet.

7. The method of claim 1 wherein said voice connection between said first and second communications devices is established over a public switched telephone network.

8. The method of claim 1 further comprising the step of recording said verbal announcement of said call request signal by said second communications device.

9. The method of claim 8 further comprising the step of storing said verbal announcement of said call request signal in a message log by said second communications device.

10. The method of claim 1 further comprising the step of transmitting a signal representative of a called party's willingness to receive said verbal announcement of said call request signal to said first communications device.

11. The method of claim 1 wherein the step of transmitting a call request signal includes the steps of recording said call request signal and storing said call request signal as an audio file.

12. The method of claim 1 wherein the step of transmitting said call request signal comprises the step of transmitting said call request signal to a network server for further transmission of said call request signal.

13. The method of claim 1 further comprising the step of receiving said call request signal at a third communications device.

14. A method for completing a telephone call comprising the steps of:

transmitting a call request signal, received from a first communications device, over a non-dedicated communications medium to a second communications device, said call request signal containing a verbal announcement, generated prior to initiating a call to a called party, where said call request signal is transmitted without requiring any system recognition of any portion of the verbal announcement content, and said verbal announcement to be audibly played using said second communications device;

transmitting a call answer message over said non-dedicated communications medium to said first communications device in response to said played verbal announcement;

establishing a voice connection between said first and second communications devices in response to said call answer message; and wherein the step of transmitting a call request signal includes the steps of recording said call request signal and storing said call request signal as an audio file.

15. A method for signaling a called party of an incoming telephone call comprising the steps of:

generating a voice announcement, prior to initiating a call to a called party, by a calling party by utilizing a first communications device;

transmitting said voice announcement, without requiring any system recognition of any portion of the voice announcement content, to a second communications device over a non-dedicated communications medium, wherein said second communications device is utilized by the called party;

receiving said voice announcement at said second communications device; and audibly playing said voice announcement by said second communications device to signal the called party of an incoming telephone call.

16. The method of claim 15 wherein said non-dedicated communications medium is an integrated services network.

17. The method of claim 16 wherein said integrated services network is the Internet.

18. The method of claim 15 wherein said first and second communication devices include personal computers.

19. The method of claim 15 further comprising the step of recording said voice announcement by said second communications device.

20. The method of claim 19 further comprising the step of storing said recorded voice announcement in a message log by said second communications device.

21. The method of claim 15 further comprising the step of transmitting a signal representative of the called party's willingness to receive said voice announcement to said first communications device.

22. The method of claim 15 wherein the step of generating a voice announcement by the calling party comprises the steps of recording said voice announcement and storing said voice announcement as an audio file.

23. The method of claim 15 wherein the step of transmitting said voice announcement to said second communications device comprises the step of transmitting said voice announcement to a network server for further transmission to said second communications device.

24. A method for signaling a called party of an incoming telephone call comprising the steps of:

receiving a call request signal transmitted by a calling party over a non-dedicated communications medium at a network, said call request signal containing a verbal announcement generated by the calling party prior to transmitting the call request signal to a called party; and transmitting said call request signal, without requiring any system recognition of any portion of the verbal announcement content, to the called party's communications device over said non-dedicated communications medium to signal the called party of an incoming telephone call.

25. The method for signaling a called party of an incoming telephone call of claim 24 further comprising the step of transmitting said call request signal to a second called party's communications device to signal the second called party of an incoming telephone call.

26. The method for signaling a called party of an incoming telephone call of claim 24 further comprising the steps of:

receiving a call answer message transmitted by the called party over the non-dedicated communications medium at said network in response to said call request signal; and transmitting said call answer message to the calling party.

27. A method for notifying a called party of an incoming telephone call comprising the steps of:

receiving a verbal announcement generated by a calling party, prior to initiating a call to a called party, at a first communications device;

converting said verbal announcement into a digital signal; and transmitting said digital signal, without requiring any system recognition of any portion of the verbal announcement content, to the called party at a second communications device over a non-dedicated communications medium to notify the called party of an incoming telephone call.

28. The method for notifying a called party of an incoming telephone call of claim 27 further comprising the step of storing said digital signal in a database contained in said first communications device.

29. A method for notifying a called party of an incoming telephone call comprising the steps of:

receiving a signal, encoding a verbal announcement generated by a calling party prior to initiating a call to a called party, at a communications device and said signal is received without requiring any system recognition of any portion of the verbal announcement content, and wherein said signal is associated with an incoming phone call to the called party from the calling party; and audibly playing said signal by said communications device to signal receipt of the incoming phone call from the calling party.

30. The method of notifying a called party of an incoming telephone call of claim 29 further comprising the step of storing said signal in a database contained in said communications device.

31. A method for signaling a called party of an incoming telephone call comprising the steps of:

receiving a voice announcement, generated prior to initiating a call to a called party, from a first communications device utilized by a calling party;

storing said voice announcement as an audio file; and transmitting said voice announcement, without requiring any system recognition of any portion of the voice announcement content, over a non-dedicated communications medium to a second communications device utilized by the called party, said voice announcement audibly played by said second communications device to signal the called party of an incoming telephone call.

32. A method for signaling a called party of an incoming telephone call comprising the steps of:

generating a voice announcement, prior to initiating a call to a called party, by a calling party by utilizing a first communications device;

transmitting said voice announcement, without requiring any system recognition of any portion of the voice announcement content, to a second communications device, utilized by the called party, over a non-dedicated communications medium, to be audibly played by the second communications device to signal the called party of an incoming telephone call.

* * * * *